United States Patent
Abe et al.

(10) Patent No.: US 7,580,217 B2
(45) Date of Patent: Aug. 25, 2009

(54) DISK DRIVE WITH HYBRID ANALOG-DIGITAL ACCELERATION FEEDFORWARD CONTROL SYSTEM AND METHOD FOR REJECTING ROTATIONAL VIBRATION

(75) Inventors: Jirou Abe, Ebina (JP); Gaku Ikedo, Chigasaki (JP); Tetsuo Semba, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 417 days.

(21) Appl. No.: 11/619,176

(22) Filed: Jan. 2, 2007

(65) Prior Publication Data
US 2008/0158722 A1 Jul. 3, 2008

(51) Int. Cl.
G11B 5/596 (2006.01)
G11B 21/02 (2006.01)

(52) U.S. Cl. .................... 360/77.02; 360/78.04; 360/75

(58) Field of Classification Search .................. None
See application file for complete search history.

(56) References Cited

U.S. PATENT DOCUMENTS

| | | | |
|---|---|---|---|
| 5,521,772 | A | 5/1996 | Lee et al. |
| 5,663,847 | A | 9/1997 | Abramovitch |
| 6,414,813 | B2 | 7/2002 | Cvancara |
| 6,496,320 | B1 | 12/2002 | Liu |
| 6,580,579 | B1 | 6/2003 | Hsin et al. |
| 6,710,966 | B1 | 3/2004 | Codilian et al. |
| 6,914,743 | B1 * | 7/2005 | Narayana et al. ......... 360/77.08 |
| 7,177,113 | B1 * | 2/2007 | Semba et al. ............ 360/77.07 |

OTHER PUBLICATIONS

Abramovitch, "Rejecting Rotational Disturbances on Small Disk Drives Using Rotational Accelerometers," Proc of the 1996 IFAC World Cong, San Fran, CA, Jul. 1996, pp. 1-6.
Jinzenji et al., "Acceleration Feedforward Control Against Rotational Disturbance in Hard Disk Drives," IEEE Transactions on Magnetics, vol. 37, No. 2, Mar. 2001, pp. 888-893.
White et al., "Increased Disturbance Rejection in Magnetic Disk Drives by Acceleration Feedforward Control," Proc of the 1996 IFAC World Cong, San Fran, CA, 1996, pp. 489-494.

* cited by examiner

*Primary Examiner*—Andrew L Sniezek
(74) *Attorney, Agent, or Firm*—Thomas R. Berthold

(57) ABSTRACT

A disk drive uses a hybrid analog-digital acceleration feedforward control system and method for cancellation of rotational disturbances. A rotational vibration (RV) sensor is used with an analog circuit to generate an analog feedforward signal that is summed with the analog actuator control signal from the servo control processor. The analog feedforward signal is also converted to a digital feedforward signal and input to the processor. When the actuator gain deviates from its design value, the processor retrieves the appropriate actuator gain value from a lookup table. The processor uses the actuator gain value and the digital feedforward signal to calculate a modified feedforward signal, which is a fraction of the digital feedforward signal. The processor also calculates a feedback control value from the servo positioning information and a feedback controller. The modified feedforward signal is then summed with the feedback control value to generate the digital actuator control signal, which is converted to the analog actuator control signal. If the actuator gain is at its design value, the calculated modified feedforward signal is zero so the digital feedforward signal is not used.

17 Claims, 5 Drawing Sheets

DISK DRIVE WITH HYBRID ANALOG-DIGITAL ACCELERATION FEEDFORWARD CONTROL SYSTEM AND METHOD FOR REJECTING ROTATIONAL VIBRATION

BACKGROUND OF THE INVENTION

1. Field of the Invention

This invention relates generally to disk drives, and more particularly to a magnetic recording disk drive that includes a system for canceling the effects of rotational vibration.

2. Description of the Related Art

Magnetic recording hard disk drives (HDDs) use an actuator, typically a rotary voice-coil-motor (VCM) type of actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data.

Disk drives experience rotational vibration and disturbance forces during normal operation. These disturbances arise internally, such as from motion of the VCM actuator, as well as externally, such as from shocks to the frame supporting the disk drive or from the movement of other disk drives when the drives are mounted together in a disk array system.

Rotational vibration (RV) cancellation is a method that uses sensors (typically accelerometers) to detect rotational vibration and improve the PES by canceling the off-track motion induced by the rotational vibration. The RV sensor signal is input to a feedforward controller that creates a feedforward compensation signal that is summed with the control signal to the VCM actuator. The use of a RV sensor and feedforward compensation in this manner is well-known, as described by Jinzenji et al., "Acceleration Feedforward Control Against Rotational Disturbance in Hard Disk Drives," *IEEE Transactions on Magnetics*, Vol. 37, No. 2, March 2001, pp. 888-893; and M. T. White et al., "Increased Disturbance Rejection in Magnetic Disk Drives by Acceleration Feedforward Control," *Proceedings of the 13th Triennial IFAC World Congress*, Jun. 30-Jul. 5, 1996, San Francisco, Calif., pp. 489-494.

The RV cancellation performance is dependent on the accuracy of gain and phase matching of the RV sensor signal to the VCM actuator. The VCM gain, i.e., its output or response to a control signal input, is not fixed at its design or optimal value, but varies with both temperature and position of the head on the disk. Typically the VCM gain can vary by up to about 20% from its optimal value.

The two conventional implementations of acceleration feedforward control for RV cancellation are analog and digital. The analog implementation uses an analog circuit to generate an analog feedforward compensation signal that is summed with the analog VCM control signal. The analog approach has the advantage of good RV cancellation because there is no phase delay. However, the analog circuit, which is designed so that the RV sensor gain matches the design or optimal VCM gain, is not able to adjust for changes to the VCM gain. The digital implementation uses a digital processor to generate a digital VCM control signal, which requires analog-to-digital conversion and digital sampling of the RV sensor signal, which in turn cause a phase delay. The processor can implement a digital filter to recover the phase delay, but the phase lead filter increases the gain at high frequency, so the gain matching becomes worse at high frequency.

What is needed is a disk drive with a method for RV cancellation that uses the advantages of both the analog and digital implementations while minimizing their disadvantages.

SUMMARY OF THE INVENTION

The invention relates to a disk drive with a hybrid analog-digital acceleration feedforward control system and method for cancellation of rotational disturbances. A rotational vibration (RV) sensor, which may be a pair of single-axis linear accelerometers, is used with an analog circuit to generate an analog feedforward signal that is summed with the analog actuator control signal from the servo control processor. The analog feedforward signal is also converted to a digital feedforward signal and input to the servo control processor. The disk drive includes a temperature sensor and a lookup table of actuator gain values. When the actuator gain deviates from its design or optimal value as a result of changes in temperature and/or position of the head on the disk, the processor retrieves the appropriate actuator gain value from the lookup table. The processor uses the actuator gain value and the digital feedforward signal to calculate a modified feedforward signal, which is a fraction of the digital feedforward signal. The processor also calculates a feedback control value from the servo positioning information and a feedback controller. The modified feedforward signal is then summed with the feedback control value to generate the digital actuator control signal, which is converted to the analog actuator control signal. Thus, the phase delay is minimized because the entire analog feedforward signal is summed with the analog actuator control signal, but there is still some adjustment for changes in actuator gain. If the actuator gain is at its design or optimal value, i.e., there is no change in actuator gain, the calculated modified feedforward signal is zero so the digital feedforward signal is not used. In this case, only the analog feedforward signal is acting as the acceleration feedforward control, and the best vibration cancellation performance is obtained because there is minimal phase delay since there is no analog-to-digital conversion and no digital sampling of the RV sensor signal.

For a fuller understanding of the nature and advantages of the present invention, reference should be made to the following detailed description taken together with the accompanying figures.

DETAILED DESCRIPTION OF THE INVENTION

Figure 1:
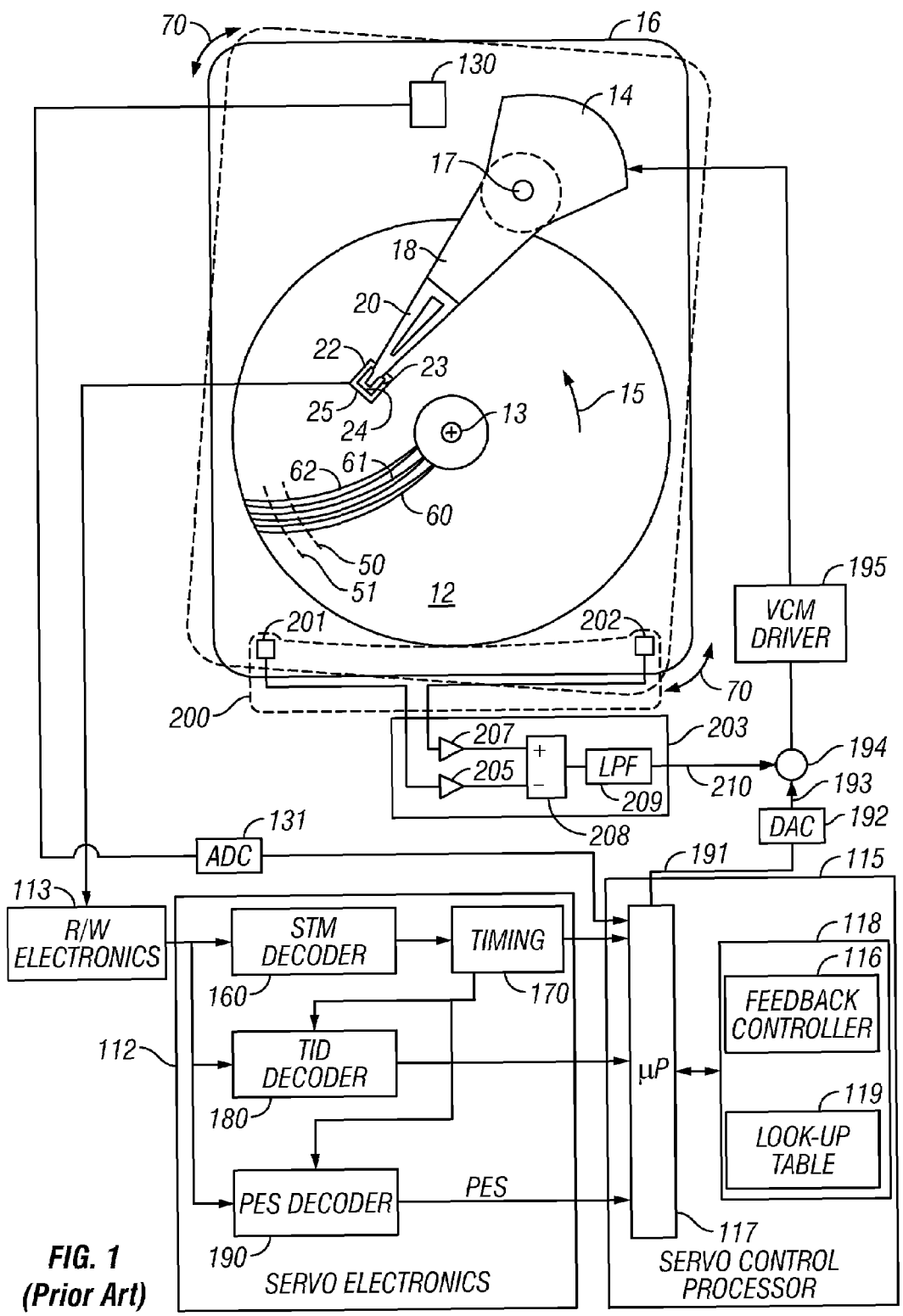
FIG. 1 is a schematic top view of a magnetic recording hard disk drive with a rotational vibration (RV) sensor and analog implementation of acceleration feedforward control of rotational vibration according to the prior art.

FIG. 1 is a block diagram of a magnetic recording HDD according to the prior art. The disk drive includes a magnetic recording disk 12 that is rotated about an axis of rotation 13 in direction 15 by a spindle motor (not shown) mounted to the disk drive housing or base 16. The disk 12 has a magnetic recording layer with concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track contains a servo timing mark (STM) that indicates the start of the servo sector, a track identification (TID) code, and a portion of a pattern of magnetized blocks or high-frequency bursts that are decoded to provide a head position error signal (PES).

The disk drive also includes an actuator 14, such as a rotary voice coil motor (VCM) type of actuator, supported on the base 16. The actuator 14 pivots about axis 17 and includes a rigid actuator arm 18. A generally flexible suspension 20 includes a flexure 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head and sent to R/W electronics 113. The servo electronics 112 receives input from R/W electronics 113 and provides digital signals to servo control processor 115. The servo control processor 115 provides a digital actuator control signal 191 to digital-to-analog converter (DAC) 192, which sends an analog actuator control signal 193 through summing junction 194 to VCM driver 195. VCM driver 195 controls current to the VCM 14 to move the read/write head 24 to the desired data track and maintain it on track for reading and writing of data.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from read/write electronics 113 and passes a position error signal (PES) to servo control processor 115.

The servo control processor 115 includes a microprocessor 117 and memory 118 accessible by the microprocessor 117. The microprocessor 117 uses the PES as input to a control algorithm to generate the digital control signal 191. The control algorithm is a feedback "controller" 116 in memory 118 and includes program instructions and a set of parameters based on the static and dynamic characteristics of the "plant" being controlled, i.e., the VCM 14. The control algorithm is essentially a matrix multiplication algorithm, and the feedback controller parameters are coefficients used in the multiplication. The method of designing the feedback controller 116 is well-known in the digital servo control and disk drive servo control literature. The feedback controller 116 can be designed in the frequency domain to achieve the desired open-loop input-output frequency response of the VCM 14. The input-output behavior of a dynamic system at any frequency can generally be expressed by two parameters, the gain (G) and the phase ($\phi$) representing the amount of attenuation/magnification and phase-shift, respectively. The gain and phase of a dynamic system represent the frequency response of the system and can be generated by experiment.

The gain of the VCM 14 is one of the parameters of feedback controller 116. However, the VCM gain is not fixed at its design or optimal value, but varies with temperature. Also VCM actuators do not have a constant gain over their entire stroke range because of the non-uniformity of the flux generated by the magnet assembly, so VCM gain also varies with position of the head on the disk. Typically this VCM gain variation can be up to about 20% of its design or optimal value. For example, the highest VCM gain with head position is typically near mid-diameter on the disk. If the VCM gain is set at its design or optimal value at 1.0 with head position near the disk outer diameter, then a typical VCM gain variation might be 1.10 at the mid-diameter head position and 0.9 at the inner diameter head position. To adjust for changes in VCM gain with temperature and head position, the disk drive may include a temperature sensor 130 located near VCM 14, an analog-to-digital converter 131, and a lookup table 119 in memory 118. The temperature sensor 130 sends an analog signal to ADC 131 which provides a digital temperature value to microprocessor 117. Microprocessor then looks up in table 119 an actuator gain value associated with the temperature value. The look up table 119 also typically includes a set of actuator gain values associated with a set of head positions. Thus during operation of the servo control system the feedback controller 116 selects the appropriate actuator gain value from look up table 119 and uses this parameter as part of the calculation of the digital control signal 191. For example, if during design of the disk drive it was known that the VCM gain may vary up to about 20%, lookup table 119 may contain a set of 21 gain values ranging from 0.9 to 1.10, with the appropriate gain value being selected as the gain parameter in the feedback controller 116, based on temperature and/or head position, to increase or decrease the gain value from its design or optimal value of 1.0.

The disk drive is subject to rotational disturbances, as shown by arrows 70, that arise both internally, such as from motion of the VCM 14, and externally, such as from shocks to the frame supporting the disk drive or from the movement of other disk drives when the drives are mounted together in a disk array system. These disturbances cause track misregistration (TMR) of the read/write heads. Thus it is known to incorporate into the disk drive a rotational vibration (RV) sensor coupled to a feedforward compensation circuit for canceling the effects of the rotational disturbances.

FIG. 1 illustrates the prior art analog implementation of acceleration feedforward control with RV sensor 200 and feedforward compensation circuit 203. The RV sensor 200 may be a rotational accelerometer, shown as two linear accelerometers 201, 202, each attached to a respective side of base 16. The linear accelerometers 201, 202 are commercially available single-axis piezoelectric accelerometers, such as Murata Model PKGS-00LD accelerometers. The accelerometer is shown schematically as being attached directly to the base 16, but it may also be attached to a printed circuit board or card (not shown) that contains the disk drive electronics, which is secured to the base 16. The rotational accelerometer may also be a single-piece angular accelerometer. Other types of rotational accelerometers are commercially available from STMicroelectronics and Delphi.

The RV sensor 200 provides its analog output to a feedforward compensation circuit 203. If the RV sensor is the type with two linear accelerometers, then the outputs from linear accelerometers 201, 202 are sent to respective amplifiers 205, 207 in circuit 203. The difference in output of the two amplifiers 205, 207 is summed at adder 208. The output of adder 208 is passed through a low-pass filter (LPF) 209 where it is output from circuit 203 as analog feedforward signal 210. LPF 209 eliminates noise from the RV sensor 200 at high frequencies. The feedforward compensation circuit 203 may also optionally include a notch filter for canceling the resonant frequencies of the RV sensor 200. Analog feedforward signal 210 is sent to summing junction 194 where it is summed with the analog actuator control signal 193 from DAC 192.

Figure 2:
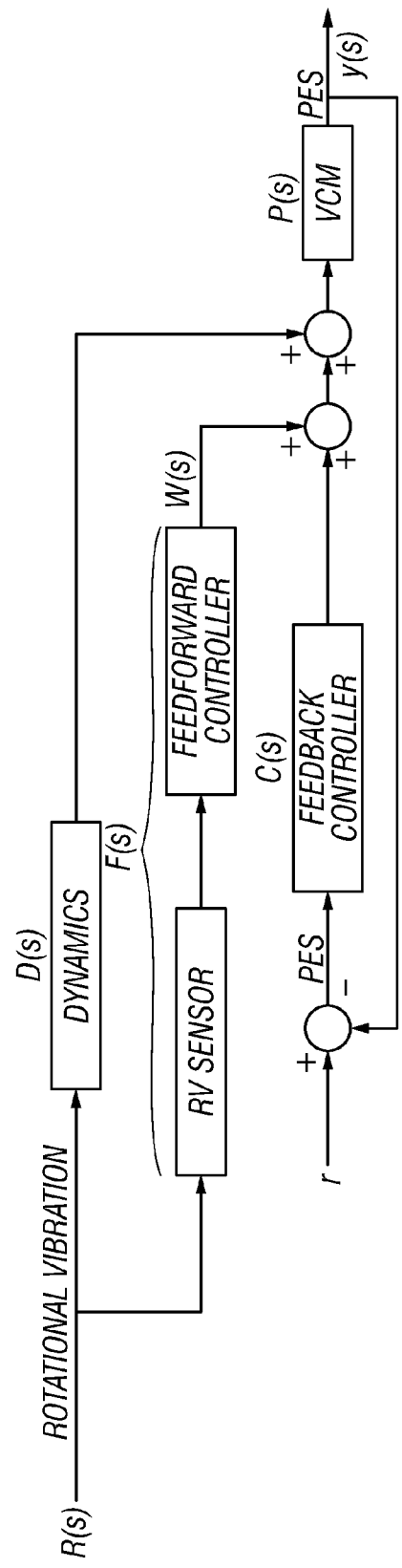
FIG. 2 is the control system loop for both the prior art analog and digital implementations of acceleration feedforward control of rotational vibration.

The control system loop for a disk drive with acceleration feedforward control is shown in FIG. 2. P(s) is the actuator (VCM 14) or "plant" transfer function, where s is the Laplace transform variable. This transfer function is known from modeling (e.g., finite element modeling) during the disk drive design process, verified through standard frequency response measurement techniques during the disk drive testing process, and can be tested on each individual disk drive during manufacturing or recalibration operations. C(s) represents the VCM feedback controller 116 transfer function, which is determined during the disk drive design process. It can also be verified through standard frequency response measurement techniques during testing process, and can also be tested on each individual disk drive during manufacturing or recalibration operations. The rotational vibration R(s) affects the disk drive dynamics D(s) and thus creates a disturbance added to the control signal to the VCM 14. However, the RV sensor 200 detects the rotational vibration and the feedforward controller (feedforward compensation circuit 203) compensates for the disturbance by generating a feedforward signal 210, W(s), that is summed with the VCM control signal 193 from the VCM feedback controller 116. F(s) represents the feedforward controller 116 transfer function. Thus W(s)=R(s)F(s), and with the RV feedforward compensation the actual PES is given by:

$$y(s) = \frac{P(s)}{1 + P(s)C(s)}(D(s)R(s) + F(s)R(s)) \quad \text{Equation (1)}$$

While the control loop shown in FIG. 2 is applicable to both analog and digital implementations of acceleration feedforward control, FIG. 1 illustrates the prior art analog implementation. The vibration cancellation performance is dependent on the accuracy of gain and phase matching of the RV sensor signal added to the VCM actuator. In the analog implementation, the analog feedforward signal 210 from circuit 203 is directly added to the analog VCM control signal 193 at junction 194, so there is minimal phase delay and thus the vibration cancellation is better. The analog circuit 203 is designed so that the RV sensor 200 gain matches the design or optimal VCM gain. However, the analog circuit 203 is not able to adjust for changes to the VCM gain.

Figure 3:
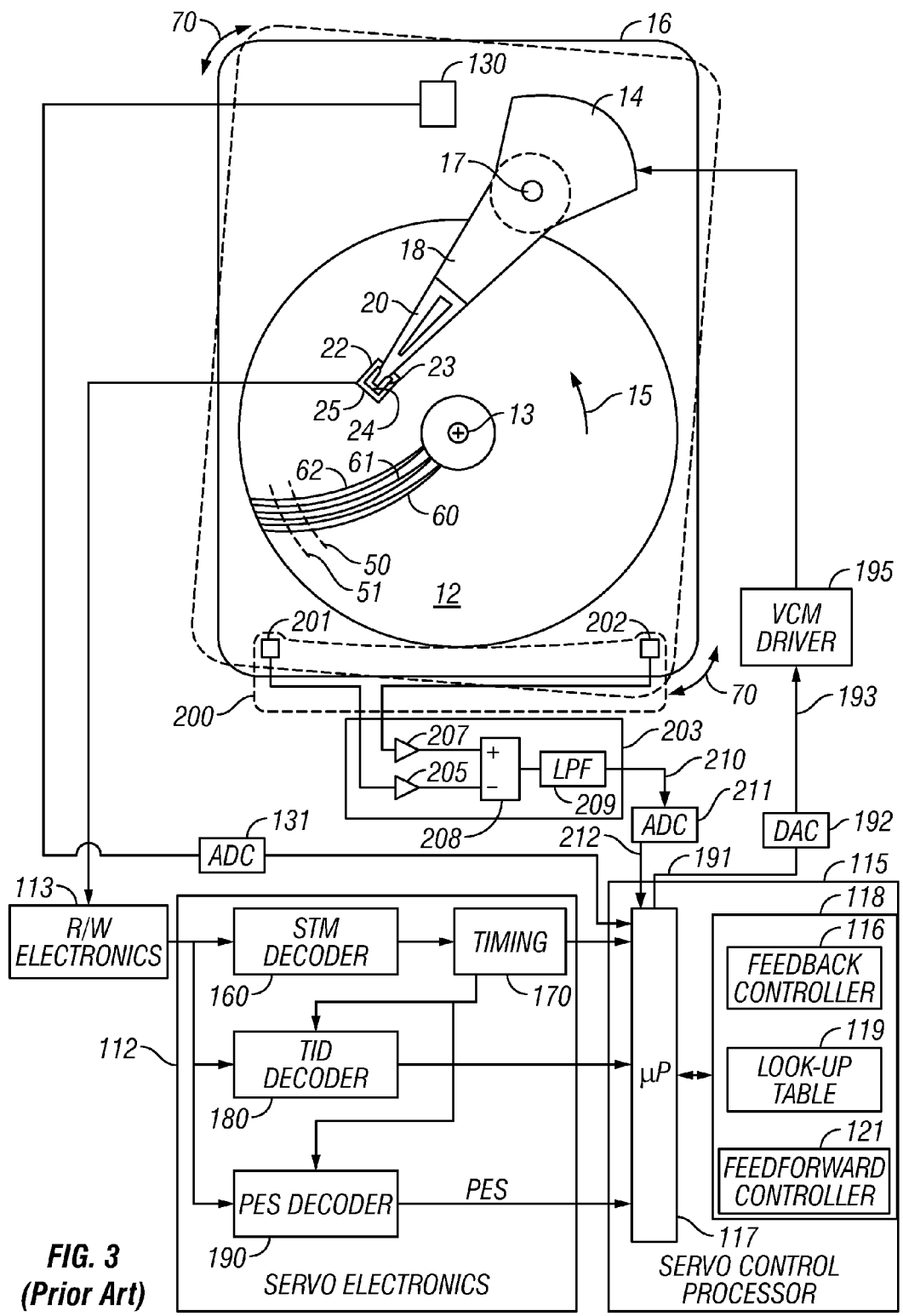
FIG. 3 is a schematic top view of a magnetic recording hard disk drive with an RV sensor and digital implementation of acceleration feed forward control of rotational vibration according to the prior art.

FIG. 3 illustrates the prior art digital implementation of acceleration feedforward control. In this implementation the output of circuit 203 is converted to a digital feedforward signal 212 by ADC 211 and then input to microprocessor 117. A feedforward controller 121 is stored in memory 118. The microprocessor 117 uses the feedforward signal 212 and the feedforward controller 121 to calculate a feedforward compensation value that is summed with the calculated feedback value to generate the digital actuator control signal 191. The feedforward controller 121 may also perform digital filtering to replace some of the functions of analog circuit 203. The feedforward controller 121 uses actuator gain values from lookup table 119 so that variations in actuator gain are taken into account during the calculation. However, for low-cost disk drives the sampling frequency and the speed of the ADC 211 are not high enough to minimize the phase delay, which adversely affects performance of the vibration cancellation. The microprocessor 117 can implement a digital filter to recover the phase delay, but since the phase lead filter increases the gain at high frequency, the gain matching becomes worse at high frequency.

Figure 4:
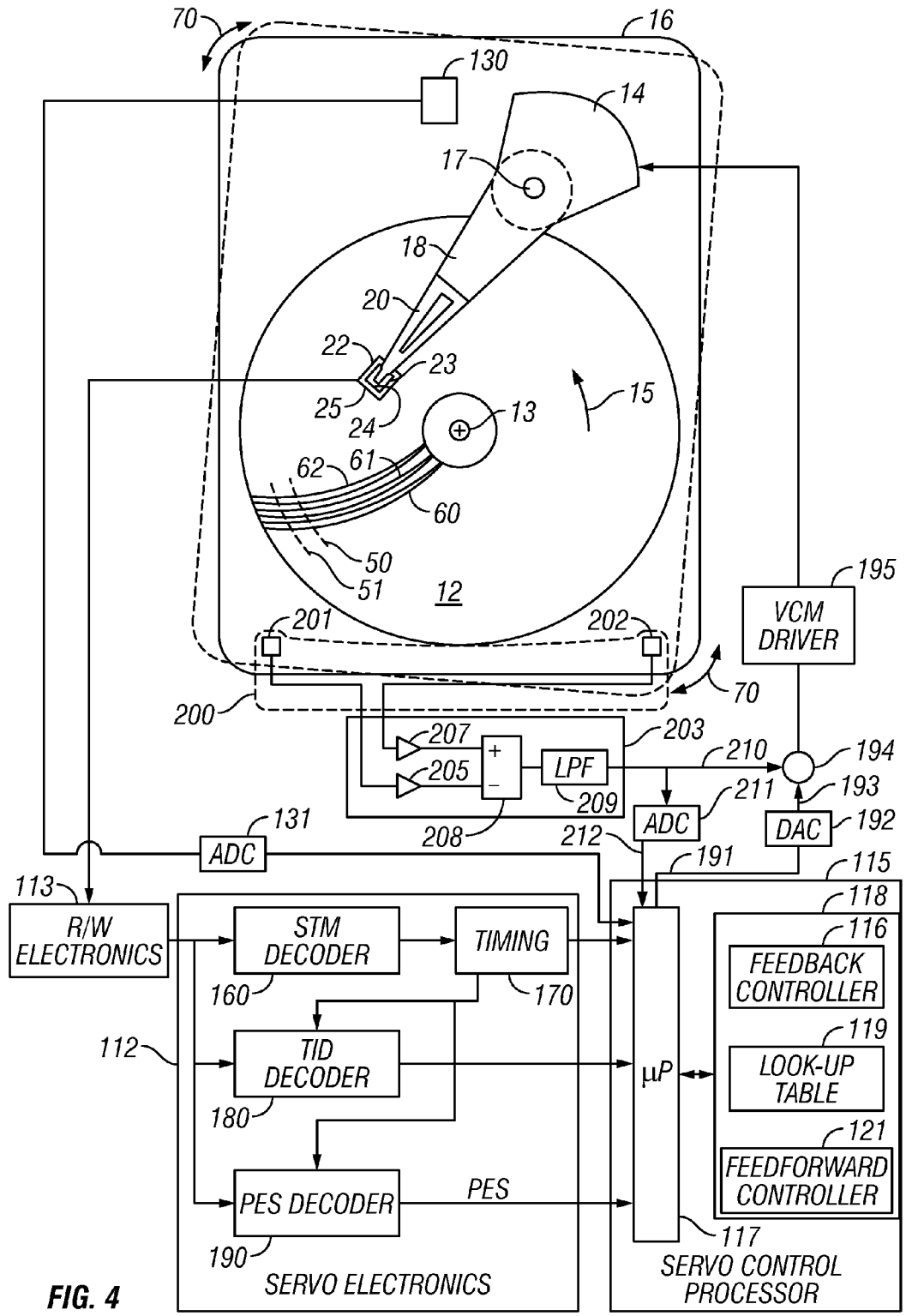
FIG. 4 is a schematic top view of a magnetic recording hard disk drive with an RV sensor and the hybrid analog-digital implementation of acceleration feedforward control of rotational vibration according to the present invention.

In this invention, as illustrated in FIG. 4, a hybrid analog-digital acceleration feedforward control method is used. The analog feedforward signal 210 is added to the analog actuator control signal 193, like in FIG. 1, but is also converted to digital feedforward signal 212 by ADC 211 and input to the microprocessor 117. When the actuator gain deviates from its optimal value of 1.0, the microprocessor 117 calculates a modified feedforward signal using the digital feedforward signal 212 and the actuator gain value from the lookup table 119. The digital feedforward signal 212 is multiplied by a multiplier derived from the actual actuator gain value from the lookup table 119, with the result representing a modified feedforward signal. In the preferred embodiment this multiplier is [(1.0/actuator gain)−optimal gain]. For example, if as a result of the temperature value and/or head position input to microprocessor 117, the actuator gain value extracted from lookup table 119 is 1.08, then the digital feedforward signal 212 is multiplied by [(1.0/1.08)−1.0] or −0.074 to arrive at the modified feedforward signal. The calculated modified feedforward signal is thus a fraction of the digital feedforward signal 212. This modified feedforward signal is then summed with the feedback control value from feedback controller 116 to generate the digital actuator control signal 191. Thus, the phase delay is minimized because the analog feedforward signal 210 is summed at junction 194, but there is still some adjustment in the digital control signal 192 as a result of a change in actuator gain. The digital feedforward signal 212 is only used when there is a change in actuator gain from its optimal gain because if the actuator gain is 1.0 the digital feedforward signal 212 would be multiplied by 0. If the actuator gain is at it's design or optimal value of 1.0, the digital feedforward signal 212 is thus not used by microprocessor 117 so that the digital actuator control signal 191 is the result of only the feedback controller 116. In this case, only the analog signal 210 is acting as the feedforward compensation, and the best vibration cancellation performance is obtained because there is minimal phase delay since there is no analog-to-digital conversion and no digital sampling of the RV sensor signal.

In the above example, the actual actuator gain is used in the multiplier according to [(1.0/actuator gain)−1.0]. In this preferred embodiment, the total gain to the actuator would be the contributions from the modified feedforward signal and the analog feedforward signal 210. Because the analog feedforward signal 210 is designed so that the actuator gain is always 1.0, the resulting gain to the actuator is {[(1.0/actuator gain)−1.0]+1.0} or just (1.0/actuator gain). However, the multiplier may also be merely a close estimate, rather than a precise calculation. For example, the multiplier could be just the deviation of actuator gain from optimal, i.e., (1.0−actuator gain). In the above example this would result in the multiplier being −0.08 instead of −0.074.

Figure 5A:
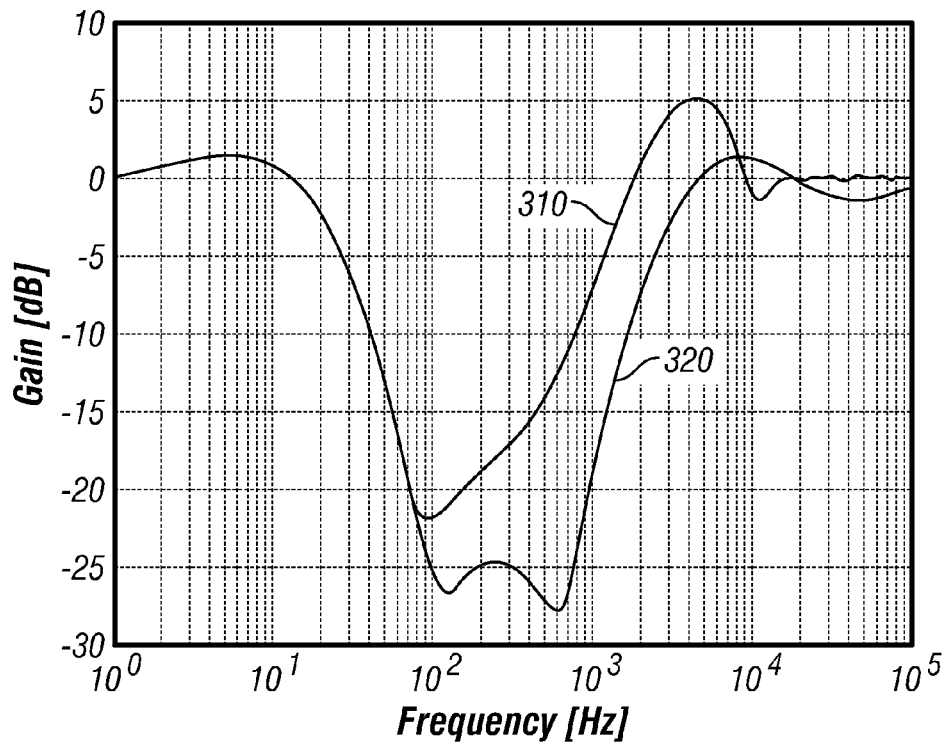
FIG. 5A is a graph comparing the rotational vibration rejection characteristics of the prior art analog and digital implementations of acceleration feedforward control of rotational vibration.

FIG. 5A shows the rejection characteristics of the rotational vibration using the prior art acceleration feedforward methods for a disk drive where the actuator gain is at its design or optimal value and the expected rotational disturbances are between about 100 and 1000 Hz. A lower gain represents better cancellation of rotational vibration. Curve 310 is the rejection characteristic for the digital implementation of FIG. 3. Curve 320 is the rejection characteristic for the analog implementation of FIG. 1, which shows better rejection than the digital implementation.

Figure 5B:
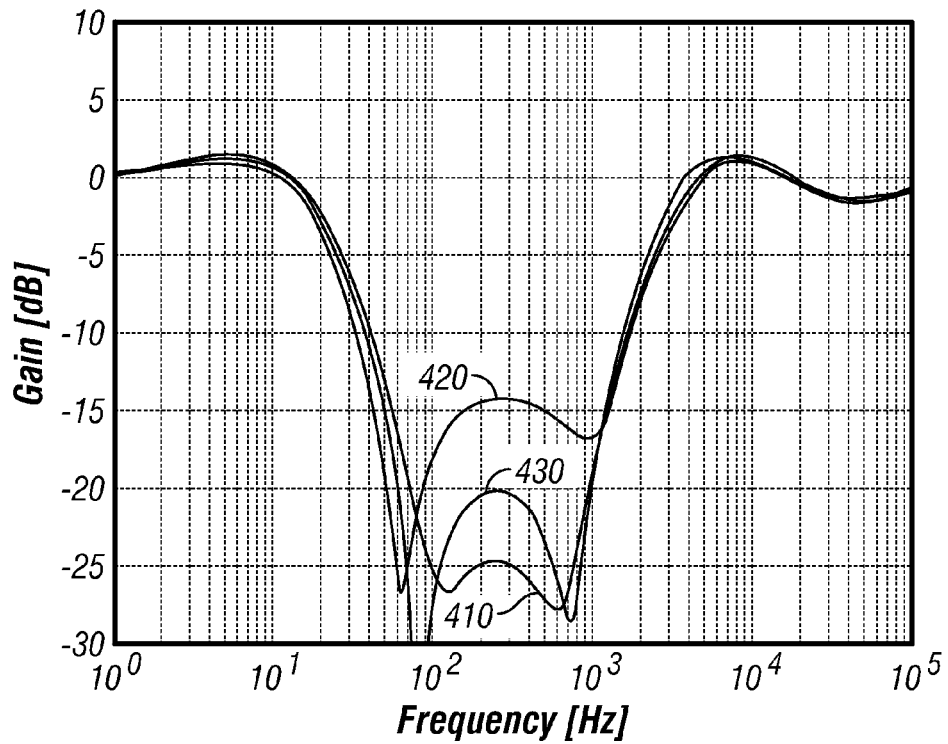
FIG. 5B is a graph showing the rejection characteristics of the rotational vibration of the hybrid analog-digital implementation of acceleration feedforward control according to the present invention.

FIG. 5B shows the rejection characteristics of the rotational vibration using the hybrid analog-digital acceleration feedforward method of this invention, also for a disk drive where the expected rotational disturbances are between about 100 and 1000 Hz. Curve 410 is the rejection characteristic where the actuator gain is at its design or optimal value, so that the calculated modified feedforward signal is 0, i.e., there is no contribution to the feedforward compensation from the digital signal. Curve 420 is the rejection characteristic where the actuator gain is 15% high, but the digital feedforward compensation is "turned off" so there is no contribution to the feedforward compensation from the digital signal. Curve 430 is the rejection characteristic where the actuator gain is 15% high for the hybrid system of this invention, i.e., the digital feedforward compensation is "turned on". Thus in curve 420, the actuator gain value of 1.15 is used to adjust the digital feedforward signal by multiplying it by [(1.0/1.15)−1.0] or −0.13 to arrive at the modified feedforward signal, which is then summed with the feedback control value to generate the digital actuator control signal 191. The rejection shown by curve 430 is relatively close to the case of optimal actuator gain (curve 410) and significantly better than the digital implementation shown by curve 310 in FIG. 5A.

The invention has been described as implemented in a magnetic recording HDD. However, the invention is applicable to other types of disk drives, such as optical disk drives, for example, CD and digital versatile disk (DVD) types of read-only and writable disk drives, that use optical disks and optical read or read/write heads.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for operating a disk drive, the disk drive including (a) a rotatable disk having a plurality of data tracks containing servo positioning information; (b) a recording head movable across the disk, the head being capable of reading data and servo positioning information in the data tracks; (c) an actuator for moving the head, the actuator having a gain representing its response to a control signal; (d) a servo control processor responsive to a position error signal (PES) from the servo positioning information for generating a digital actuator control signal; (e) memory accessible by the processor; (f) a feedback controller stored in memory and comprising a set of parameters including an actuator gain parameter; (g) a digital-to-analog converter (DAC) for converting the digital actuator control signal to an analog actuator control signal; (h) a sensor responsive to external disk drive disturbances for generating an analog sensor signal for summing with the analog actuator control signal; and (i) an analog-to-digital converter (ADC) for converting the analog sensor signal to a digital sensor signal to the processor; the processor-implemented method comprising:

calculating, from the digital sensor signal and actuator gain parameter, a modified feedforward signal; and generating, in response to the calculated modified feedforward signal, a digital actuator control signal.

2. The method of claim 1 wherein the actuator gain may deviate from an optimal gain, and wherein calculating the modified feedforward signal comprises calculating the modified feedforward signal to be zero when the actuator gain is substantially optimal.

3. The method of claim 1 wherein the actuator gain may deviate from an optimal gain, and wherein calculating the modified feedforward signal comprises applying to the digital sensor signal a nonzero multiple derived from the deviated actuator gain.

4. The method of claim 3 wherein generating a digital actuator control signal comprises calculating a feedback control value from the feedback controller using an actuator gain parameter corresponding to the deviated actuator gain and summing said feedback control value with said modified feedforward signal.

5. The method of claim 1 wherein the actuator gain varies with position of the head on the disk, and further comprising, prior to calculating the modified feedforward signal, selecting one of a plurality of actuator gain parameters in response to head position.

6. The method of claim 1 wherein the actuator gain varies with temperature and the disk drive includes a temperature sensor for providing a temperature signal to the processor, and further comprising, prior to calculating the modified feedforward signal, selecting one of a plurality of actuator gain parameters in response to the temperature signal.

7. A method for substantially canceling rotational vibration (RV) acting on a magnetic recording disk drive, the disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head, the VCM having a variable gain representing its variable response to a control signal; (d) an RV sensor; (e) a feedforward compensation circuit for generating an analog feedforward signal from the RV sensor; (e) a digital processor responsive to a position error signal (PES) from the servo positioning information for generating a digital actuator control signal; (f) a digital-to-analog converter (DAC) for converting the digital actuator control signal to an analog actuator control signal for summing with the analog feedforward signal; (g) an analog-to-digital converter (ADC) for converting the analog feedforward signal to a digital feedforward signal to the processor; and (h) memory accessible by the processor and containing a feedback controller; the processor-implemented method comprising:

calculating from the PES and the feedback controller a feedback control signal;

adjusting the digital feedforward signal in response to the actuator gain; and summing the feedback control signal with the adjusted digital feedforward signal to generate the digital actuator control signal.

8. The method of claim 7 wherein the memory contains a plurality of actuator gain values, each actuator gain value being associated with one of a plurality of head positions, and wherein adjusting the digital feedforward signal in response to a change in actuator gain comprises selecting one of said actuator gain values.

9. The method of claim 7 wherein the disk drive includes a temperature sensor for providing a temperature signal to the processor; wherein the memory contains a plurality of actuator gain values, each actuator gain value being associated with one of a plurality of temperature values; and wherein adjusting the digital feedforward signal in response to a change in actuator gain comprises detecting the temperature signal, and selecting the associated actuator gain value.

10. The method of claim 7 wherein the actuator has an optimal gain and wherein adjusting the digital feedforward signal in response to the actuator gain comprises adjusting the digital feedforward signal to be zero when the actuator gain is substantially optimal.

11. The method of claim 7 wherein the actuator has an optimal gain and wherein adjusting the digital feedforward signal in response to the actuator gain comprises multiplying the value of the digital feedforward signal by a multiplier derived from optimal gain and the actuator gain.

12. A magnetic recording disk drive comprising:
   a rotatable magnetic recording disk having a plurality of concentric data tracks containing servo positioning information;
   a recording head movable across the disk, the head being capable of reading data and servo positioning information in the data tracks;
   a voice-coil-motor (VCM) for moving the head, the VCM having a variable gain representing its variable response to a control signal;
   an rotational vibration (RV) sensor;
   a feedforward compensation circuit for generating an analog feedforward signal from the RV sensor;
   a servo control processor for generating a digital VCM control signal;
   a digital-to-analog converter (DAC) for converting the digital VCM control signal to an analog VCM control signal, the analog VCM control signal being summed with the analog feedforward signal;
   an analog-to-digital converter (ADC) for converting the analog feedforward signal to a digital feedforward signal to the processor;
   memory accessible by the processor;
   a plurality of VCM gain values stored in memory; and
   a program of instructions stored in memory and readable by the processor for undertaking method acts comprising:
      selecting one of said stored VCM gain values;
      calculating from the servo positioning information and the selected VCM gain value a feedback control signal;
      adjusting the digital feedforward signal in response to the selected VCM gain value; and
      summing the feedback control signal with the adjusted digital feedforward signal to generate the digital VCM control signal.

13. The disk drive of claim 12 wherein each VCM gain value is associated with one of a plurality of head positions, and wherein selecting one of said stored VCM gain values comprises selecting a VCM gain value in response to the head position.

14. The disk drive of claim 12 wherein the disk drive includes a temperature sensor for providing a temperature signal to the processor, and wherein selecting one of said stored VCM gain values comprises selecting a VCM gain value in response to the temperature signal.

15. The disk drive of claim 12 wherein the VCM has an optimal gain value and wherein adjusting the digital feedforward signal in response to the selected VCM gain value comprises adjusting the digital feedforward signal to be zero when the selected VCM gain value is substantially optimal.

16. The disk drive of claim 12 wherein the VCM has an optimal gain value and wherein adjusting the digital feedforward signal in response to the selected VCM gain value comprises deriving a multiplier from the selected VCM gain value and the optimal VCM gain value and multiplying said multiplier by the value of the digital feedforward signal.

17. The disk drive of claim 12 wherein the RV sensor comprises a pair of linear accelerometers.

\* \* \* \* \*